: US 10,965,345 B2
(45) Date of Patent: Mar. 30, 2021

(12) United States Patent
Stucchi et al.

(54) ACCESSORY DEVICE FOR LOW AND MEDIUM VOLTAGE SWITCHING DEVICES

(71) Applicant: ABB S.p.A., Milan (IT)

(72) Inventors: Marco Stucchi, Osio Sotto (IT); Riccardo Panseri, Bergamo (IT)

(73) Assignee: ABB S.P.A., Milan (IT)

( * ) Notice: Subject to any disclaimer, the term of this patent is extended or adjusted under 35 U.S.C. 154(b) by 0 days.

(21) Appl. No.: 16/592,105

(22) Filed: Oct. 3, 2019

(65) Prior Publication Data
US 2020/0112338 A1 Apr. 9, 2020

(30) Foreign Application Priority Data

Oct. 4, 2018 (EP) ..................... 18198551

(51) Int. Cl.
H01H 71/04 (2006.01)
H04B 3/56 (2006.01)
H01H 71/08 (2006.01)

(52) U.S. Cl.
CPC ............... H04B 3/56 (2013.01); H01H 71/04 (2013.01); H01H 2071/086 (2013.01)

(58) Field of Classification Search
USPC ........................................................ 307/112
See application file for complete search history.

(56) References Cited

U.S. PATENT DOCUMENTS

| 5,877,691 | A | 3/1999 | Suptitz et al. |
| 2014/0029167 | A1* | 1/2014 | Degli Innocenti ....... H02B 1/26 361/615 |
| 2018/0203044 | A1 | 7/2018 | Magoni et al. |

FOREIGN PATENT DOCUMENTS

WO 2012104260 A1 8/2012

OTHER PUBLICATIONS

European Patent Office, Extended Search Report issued in corresponding Application No. 18198551.6, dated Mar. 14, 2019, 10 pp.

* cited by examiner

Primary Examiner — Rexford N Barnie
Assistant Examiner — Xuan Ly
(74) Attorney, Agent, or Firm — Taft Stettinius & Hollister LLP

(57) ABSTRACT

Accessory device for a low or medium voltage switching device including an outer housing, first electrical connection means adapted to electrically connect the accessory device with an auxiliary power line and first mechanical connection means adapted to mechanically connect the accessory device with a mechanical support component of the switching device. The accessory device includes a power line communication unit electrically connectable with the auxiliary power line through the first electrical connection means and adapted to communicate with outer electronic equipment electrically connected with the auxiliary power line by transmitting and receiving communication signals along the auxiliary power line.

22 Claims, 12 Drawing Sheets

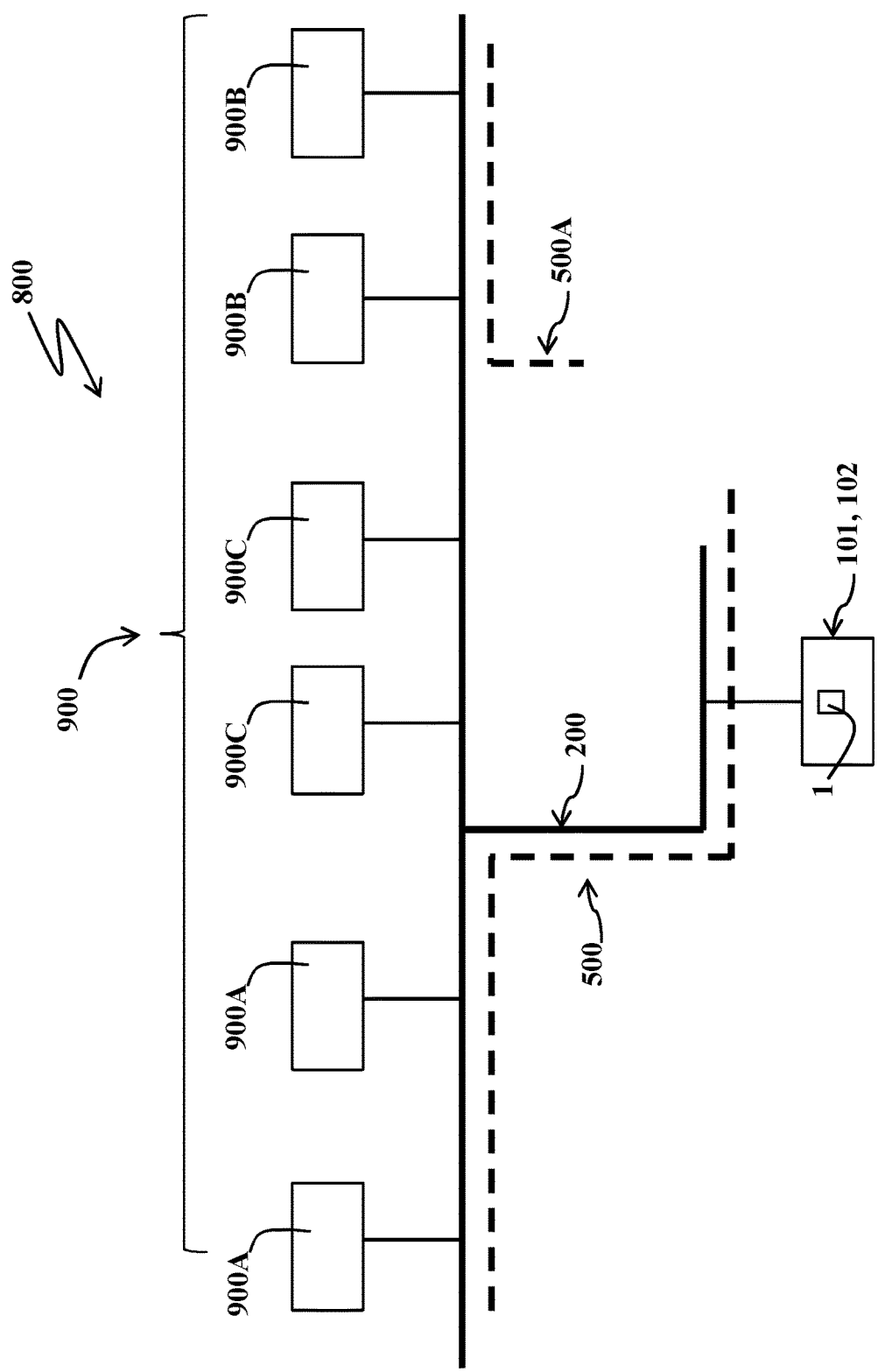

ACCESSORY DEVICE FOR LOW AND MEDIUM VOLTAGE SWITCHING DEVICES

Figure 1:
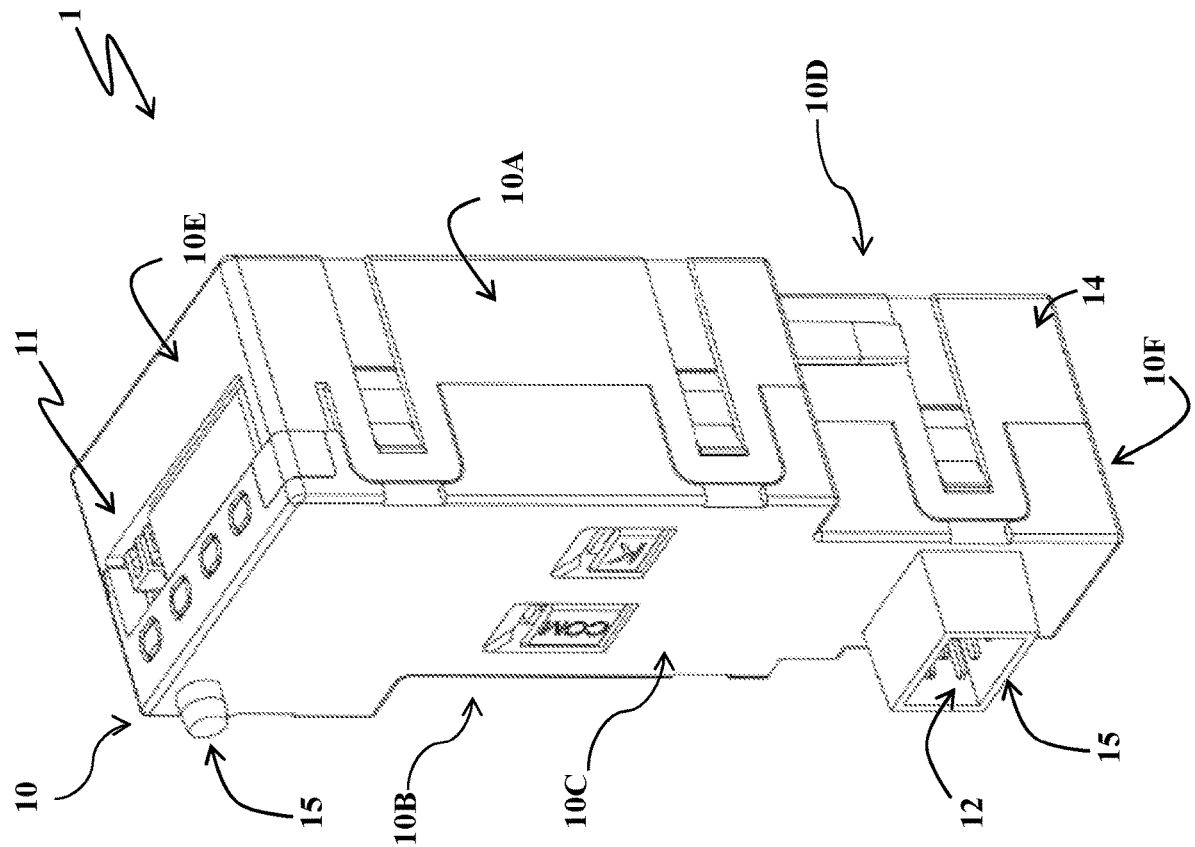

The present invention relates to the technical field of low and medium voltage switching devices, such as circuit breakers, disconnectors and contactors and the like.

More particularly, the present invention relates to an accessory device for low and medium voltage switching devices.

As is known, low voltage and medium voltage switching devices are used in power distribution networks.

Within the framework of the present invention, the term "low voltage" relates to voltages lower than 1 kV AC and 1.5 kV DC whereas the term "medium voltage" relates to higher voltages up to tens of kV, e.g. up to 72 kV AC and 100 kV DC.

Switching devices generally comprise a switching unit having an outer casing that houses one or more electric poles, each comprising a movable contact and a corresponding fixed contact.

A driving mechanism causes the movement of the movable contacts between a first coupling position (closed position), in which they are coupled to the corresponding fixed contacts, and a second separation position (open position), in which they are spaced away from the corresponding fixed contacts.

The driving mechanism is typically actuated by a trip unit operatively associated with the switching device.

Typically, the trip unit is housed within the switching unit. Nonetheless, arrangements are known, in which the trip unit is installed separately from the switching unit and, possibly, in a remote position with respect to this latter.

Normally, a switching device houses also one or more accessory devices aimed at improving or extending the functionalities of the switching unit and of the trip unit. As an example, some accessory devices may be solenoids, actuators or other active devices operatively associated with the driving mechanism of the switching unit.

Other accessory devices may be arranged to interface with internal parts of the switching unit and the trip unit in order to acquire and transmit information about the operating state of the switching unit.

Further accessory devices may be arranged to enable the transformation of signals coming from the trip unit or outer electronic equipment into commands for actuating the driving mechanism of the switching unit.

The presence of various accessory devices on board typically entails relevant problems for wiring operations when manufacturing the switching device and installing this latter on the field. In general, such wiring operations are complex and expensive to carry out, which drawback is made even more critical by the circumstance that a switching device can be employed in different operative configurations, namely in a fixed configuration or withdrawable configuration.

In the past, innovative solutions have been proposed to overcome or mitigate the above-mentioned issues.

An example of accessory device assembly, which has been considered in the market as particularly innovative with respect to most traditional arrangements, is described in US2014/0029167.

However, notwithstanding the advantages brought by these currently available devices, it is still felt the demand for technical solutions aimed at further improving the performances of a switching device in terms of reduction of the manufacturing time and costs and in terms of easiness of installation on the field, operation and maintenance.

In order to respond to this need, the present invention provides an accessory device, according to the following claim 1 and the related dependent claims.

In a general definition, the accessory device, according to the invention, comprises an outer housing, first electrical connection means adapted to electrically connect the accessory device with an auxiliary power line and first mechanical connection means adapted to mechanically connect the accessory device with a mechanical support component of the switching device. The accessory device comprises a power line communication unit electrically connectable with the auxiliary power line through the first electrical connection means.

The power line communication unit is adapted to communicate with outer electronic equipment electrically connected with the auxiliary power line by transmitting and receiving communication signals along said auxiliary power line.

According to an aspect of the invention, the accessory device comprises an internal power line electrically connecting the power line communication unit with the first electrical connection means. The power line communication unit is adapted to transmit and receive the above-mentioned communication signals through said internal power line and said first electrical connection means in such a way that said communication signals travel along the auxiliary power line.

According to an aspect of the invention, the power line communication unit comprises a first processing module and a power line interface module operatively coupled with the first processing module and electrically connected with the auxiliary power line.

According to an aspect of the invention, the accessory device comprises an additional processing unit operatively coupled with the power line communication unit. The additional processing unit comprises a second processing module operatively coupled with the first processing module of the power line communication unit and a bus interface module operatively coupled with the second processing module.

According to an aspect of the invention, the first processing module of the power line communication unit and the second processing module of the additional processing unit operate respectively as a slave device and a master device, or vice-versa, when interacting one with another.

According to an aspect of the invention, the accessory device the above-mentioned first electrical connection means are further adapted to electrically connect said accessory device with an external communication bus. In this case, preferably, the above-mentioned bus interface module is operatively coupled with said first electrical connection means by means of a first internal communication field bus.

According to an aspect of the invention, the accessory device comprises second electrical connection means adapted to electrically connect said accessory device with one or more further accessory devices of the switching device. Preferably, the above-mentioned bus interface module is operatively coupled with the second electrical connection means.

According to an aspect of the invention, the accessory device comprises third electrical connection means adapted to electrical connect said accessory device with one or more electronic components of the switching device, e.g. with a trip unit of the switching device. Preferably, the above-mentioned bus interface module is operatively coupled with said third electrical connection means by means of a second internal communication field bus.

According to an aspect of the invention, the accessory device comprises second mechanical connection means adapted to mechanically connect said accessory device with one or more further accessory devices of the switching device.

In a further aspect, the present invention relates to a switching device, according to the following claim 13 and the related dependent claims.

In yet a further aspect, the present invention relates to an electric power distribution grid, according to the following claim 16 and the related dependent claims.

Figure 2:
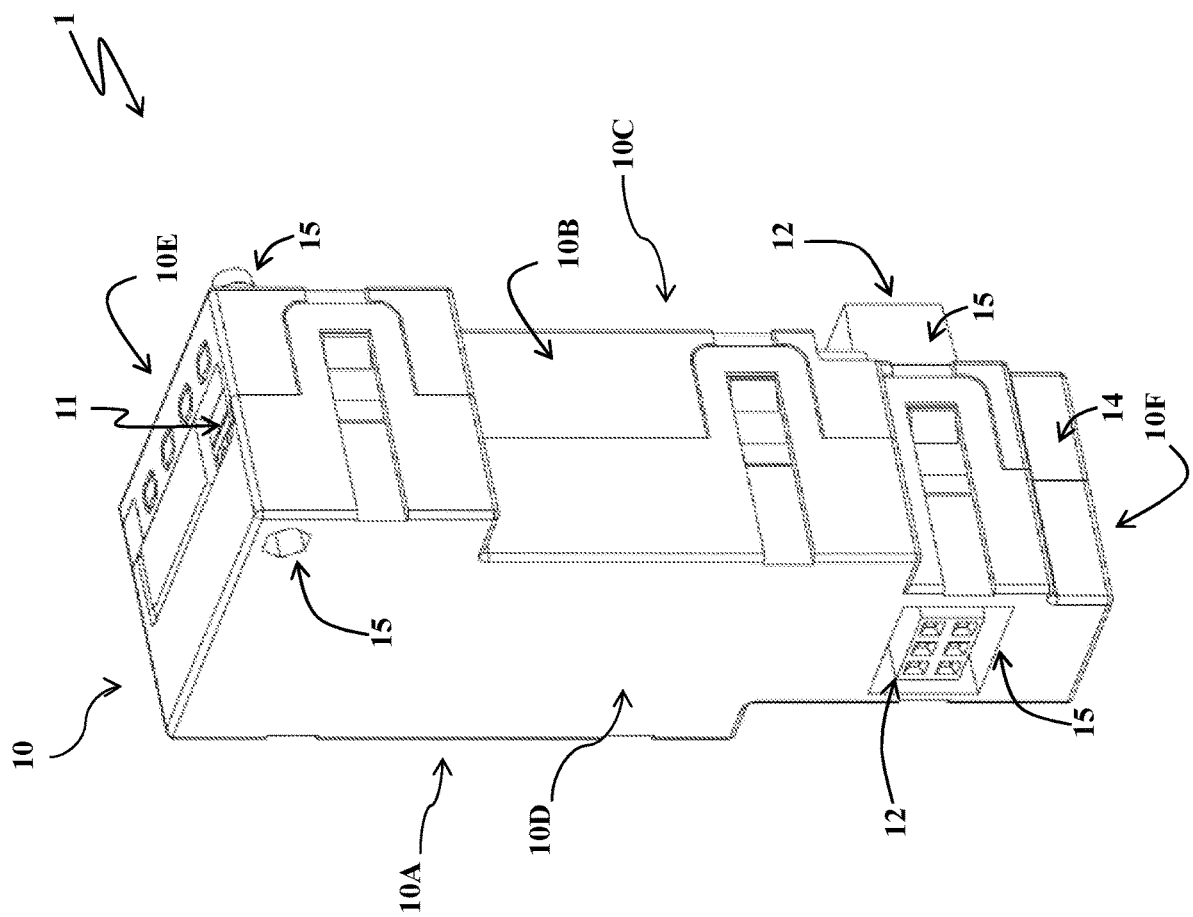
Figure 3:
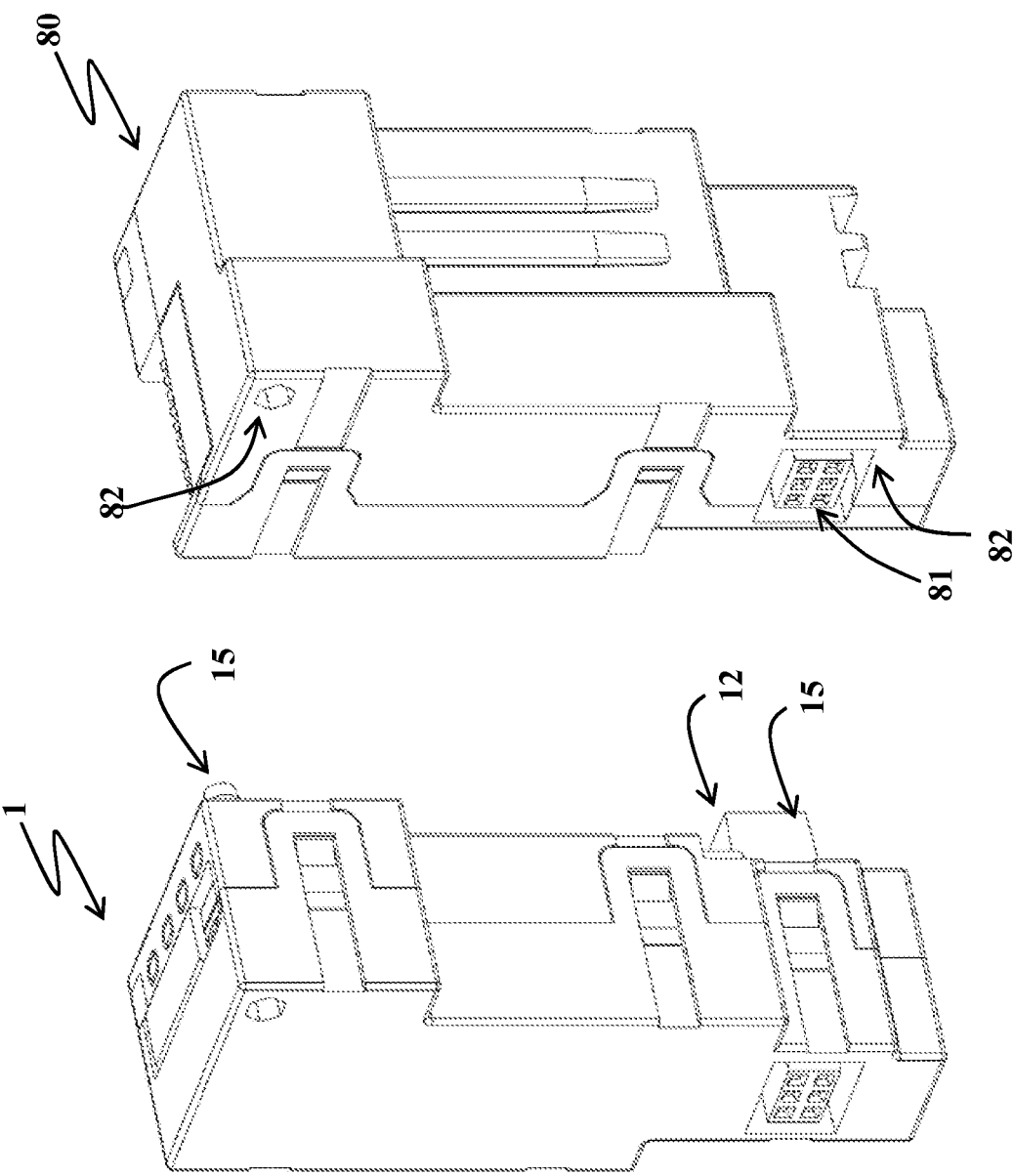
Figure 4:
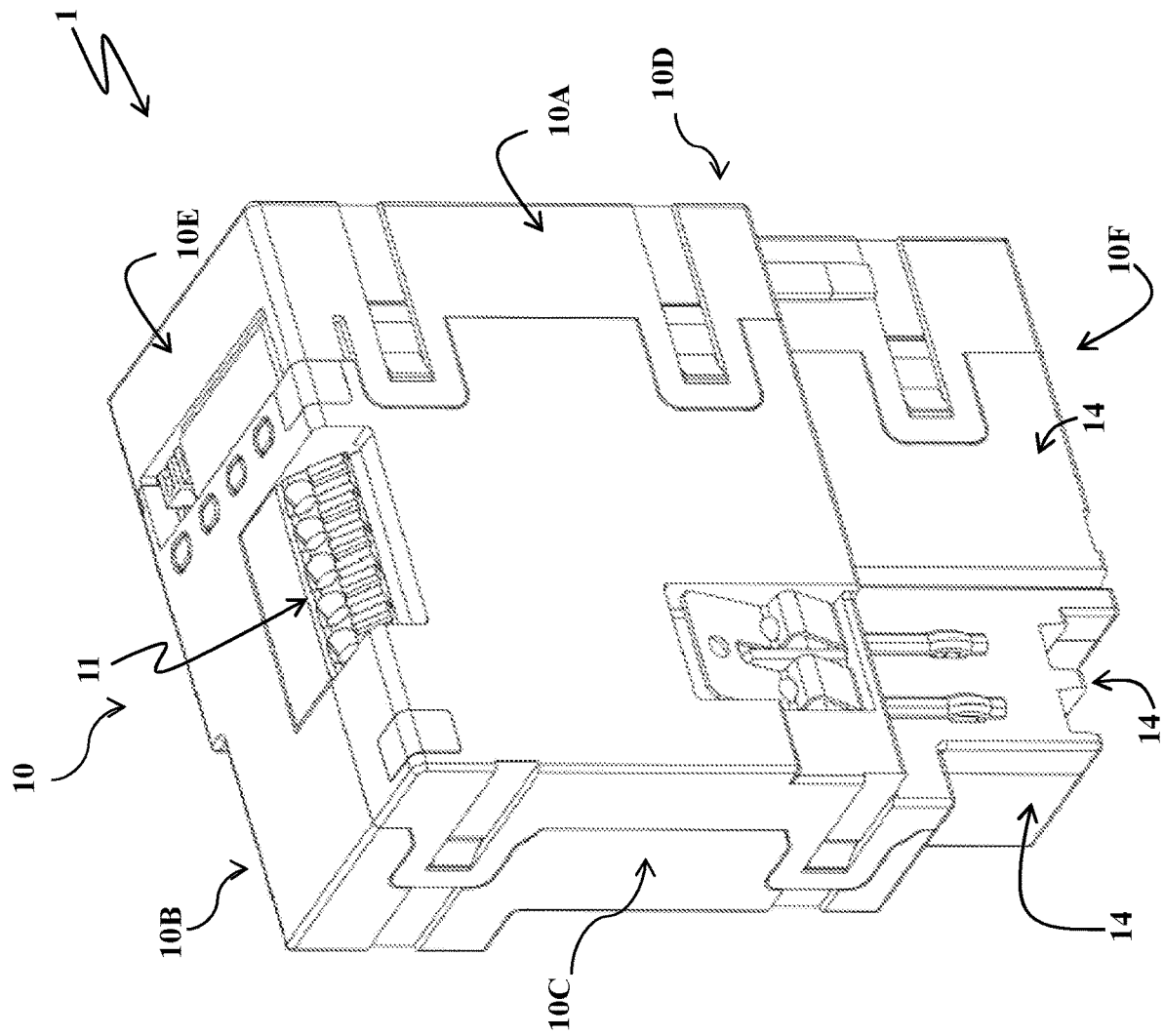
Figure 5:
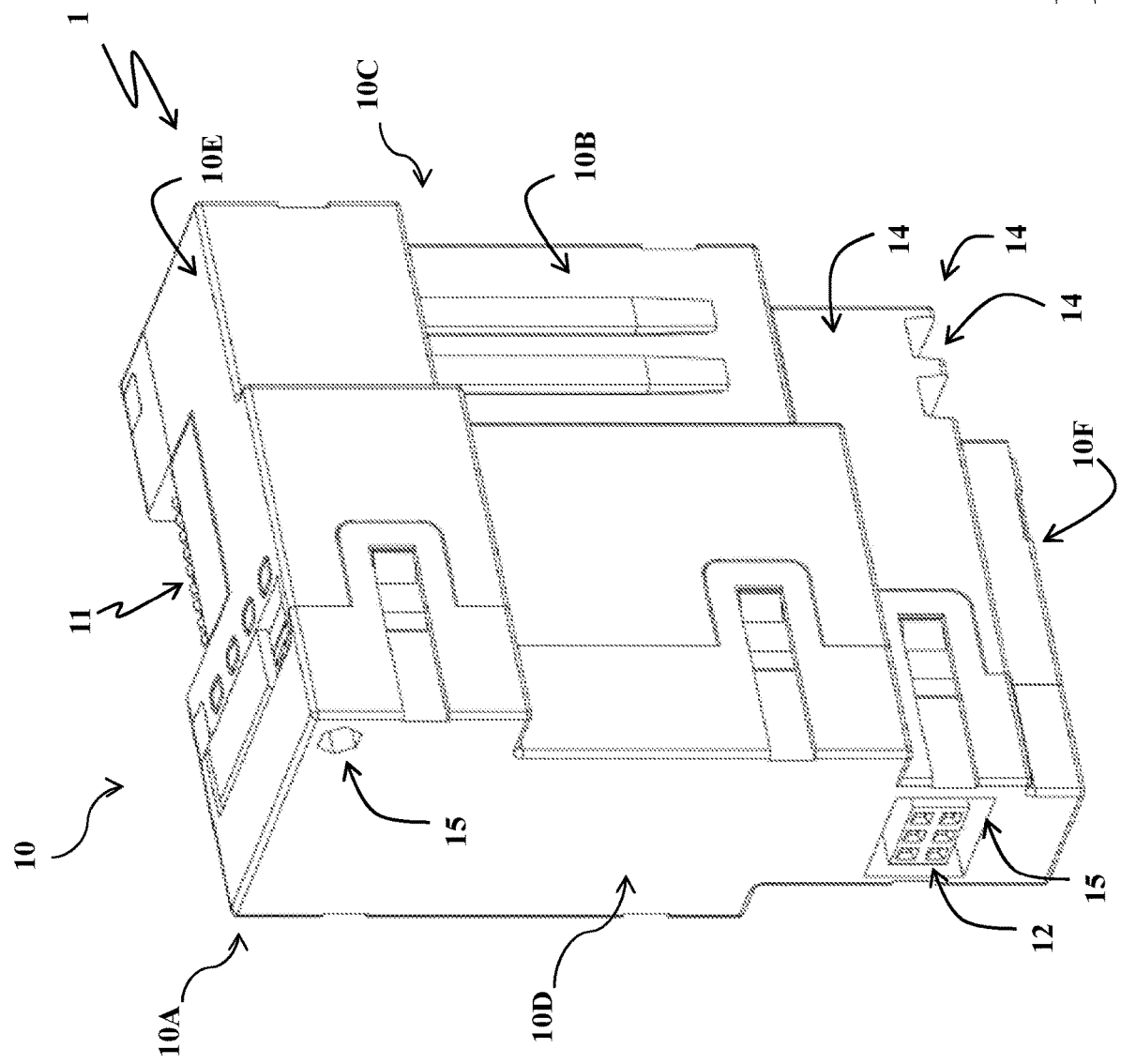
Figure 6:
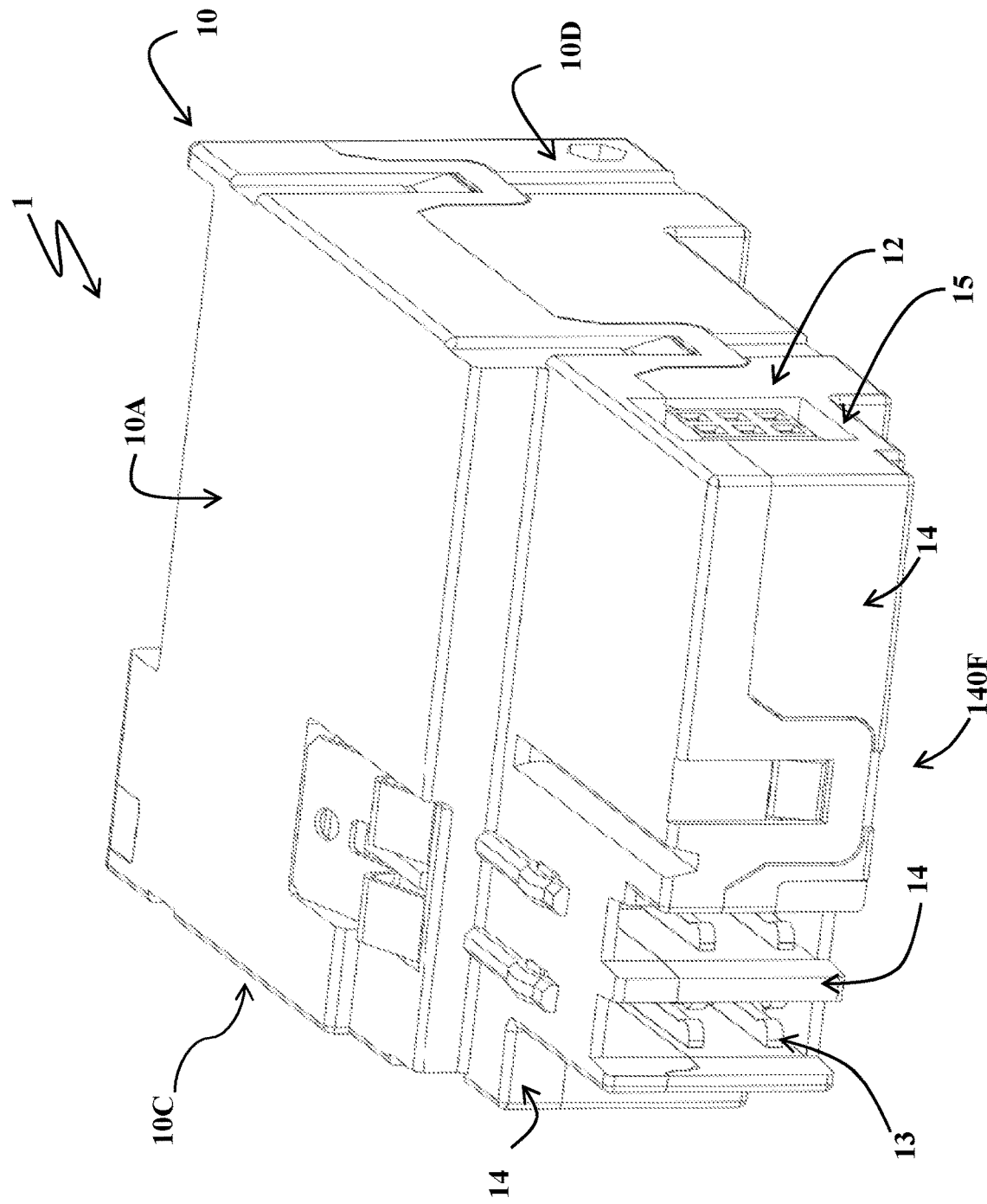
Figure 7:
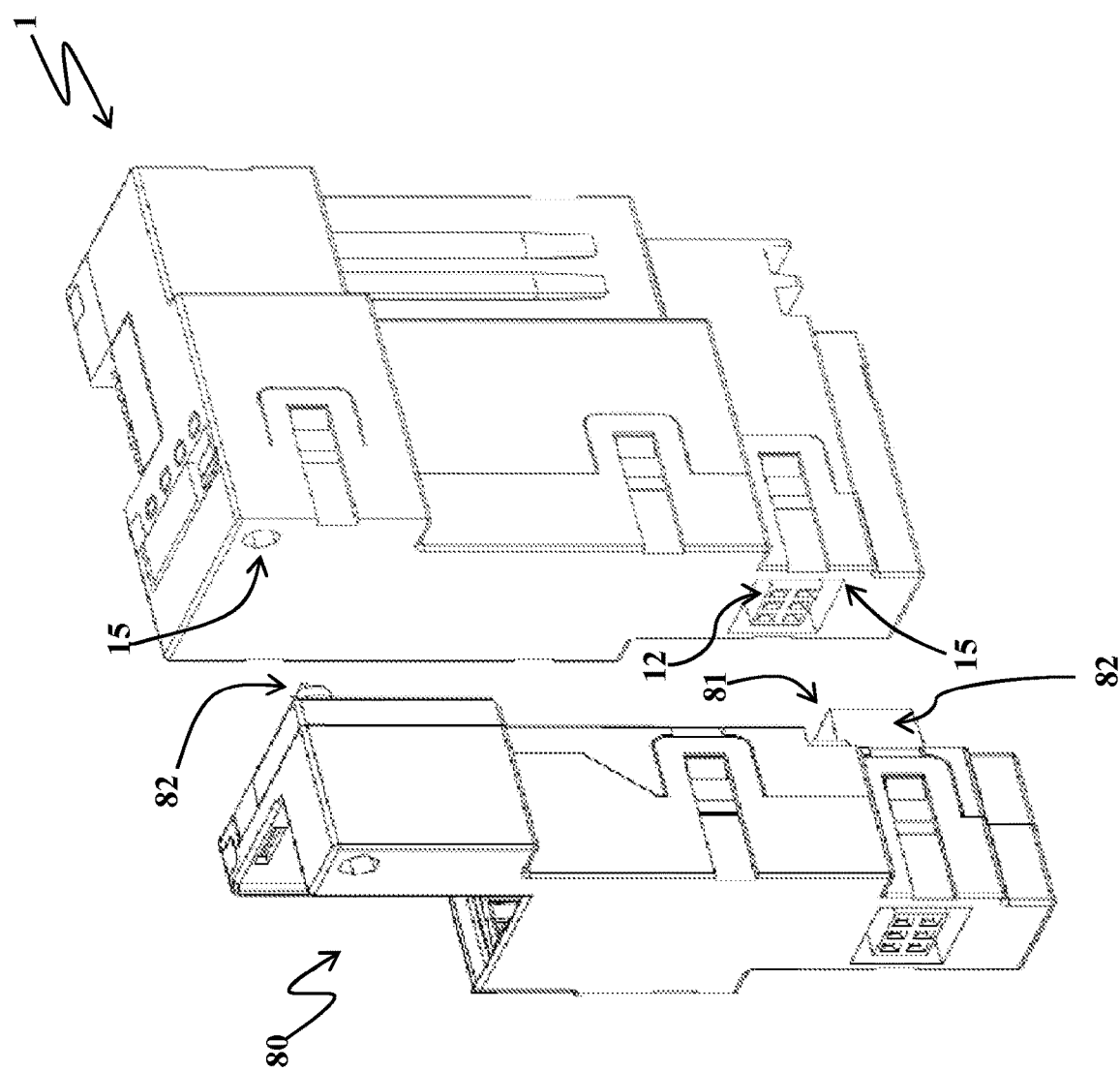
Figure 8:
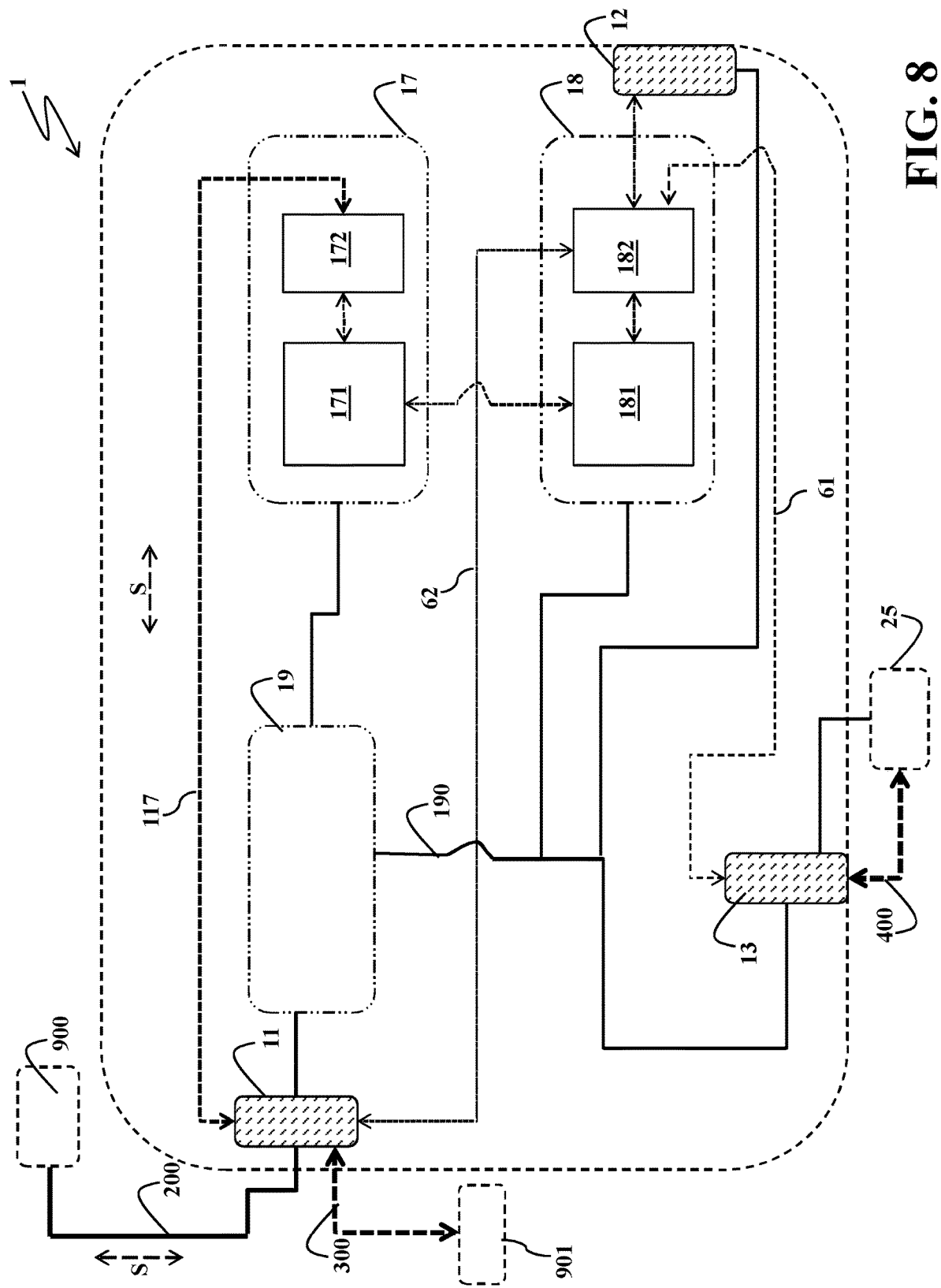
Figure 9:
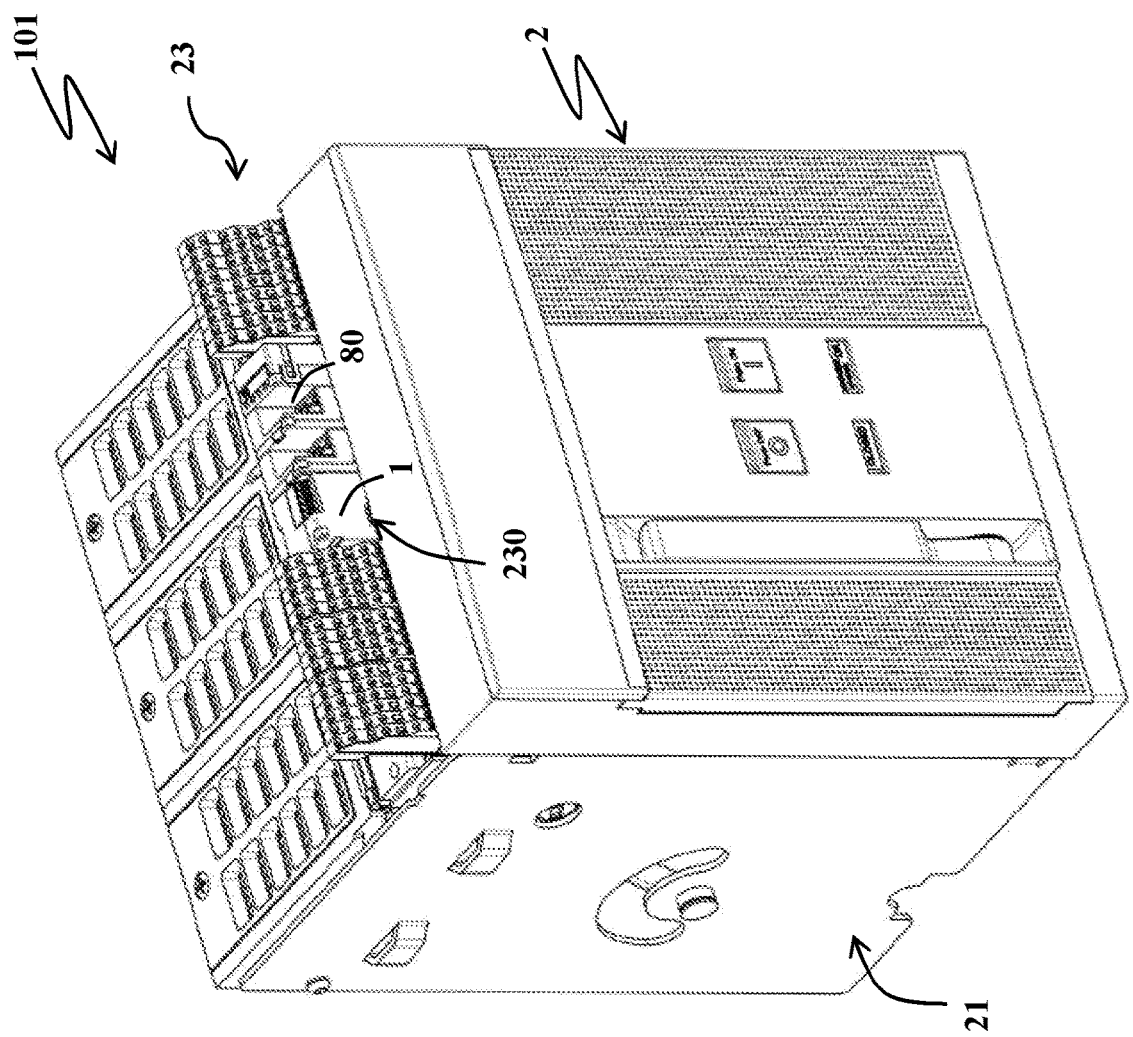
Figure 10:
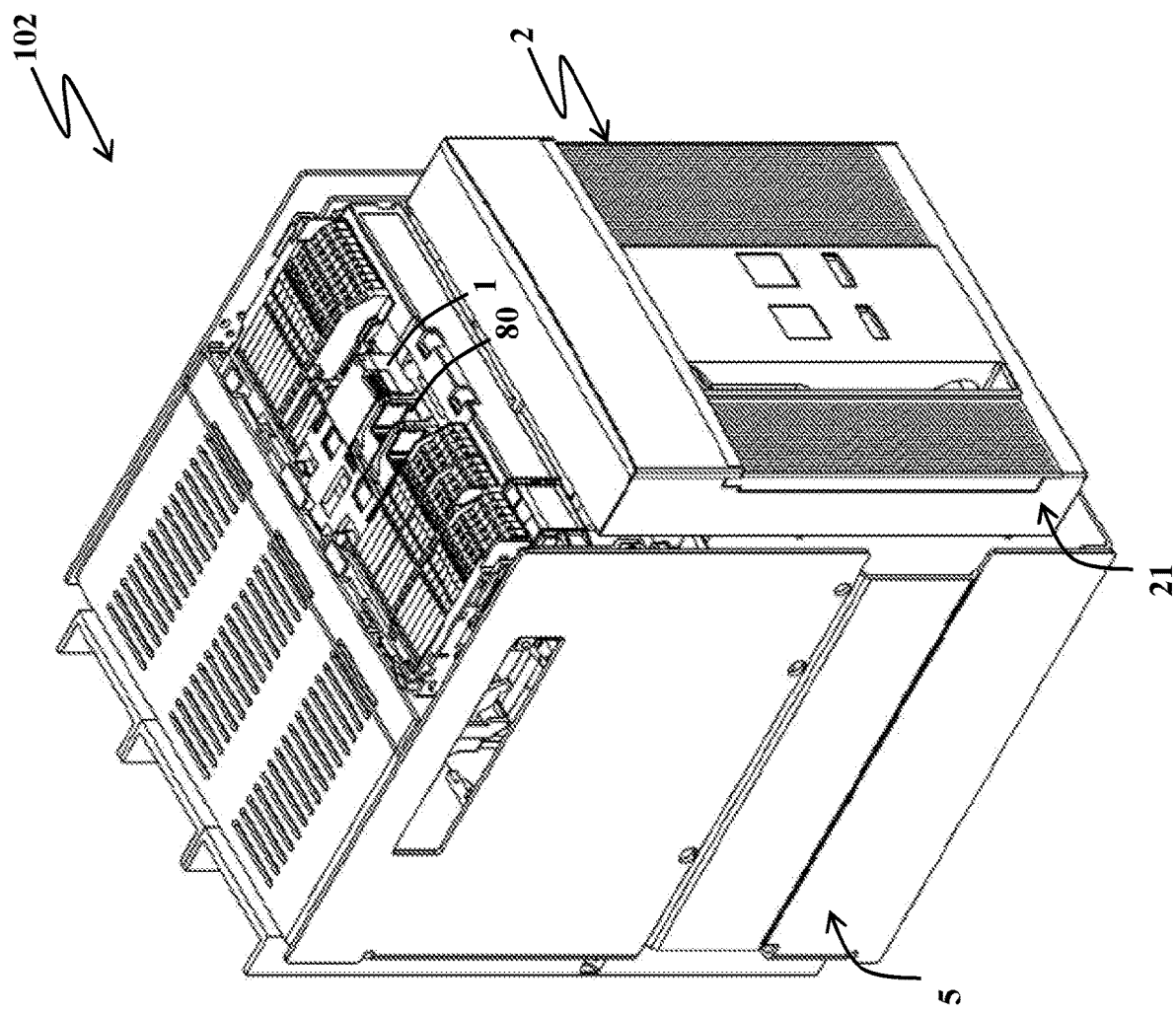
Figure 11:
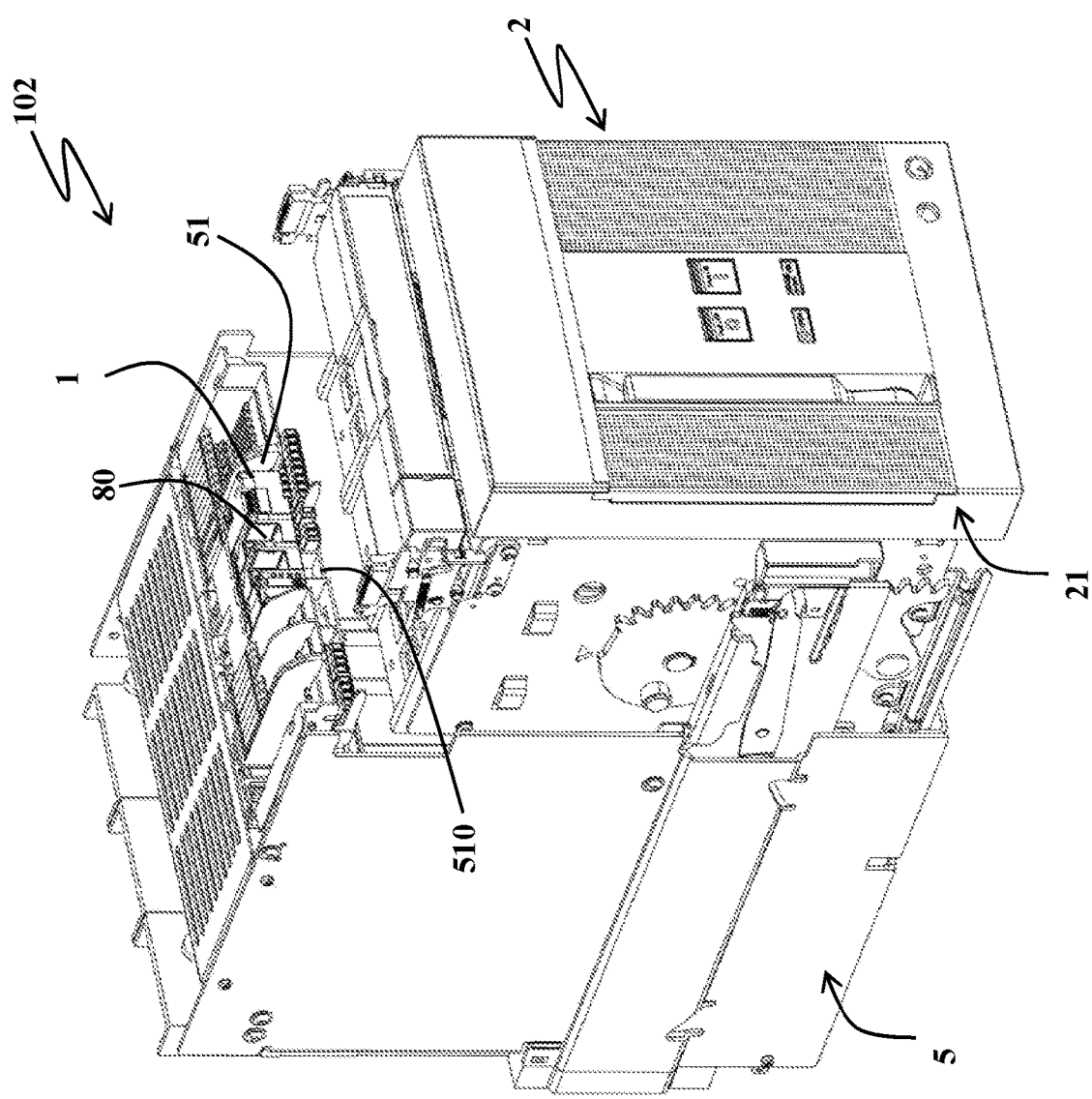

Further characteristics and advantages of the present invention shall emerge more clearly from the description of preferred but not exclusive embodiments of the method as in the invention, and the control method thereof, illustrated purely by way of example and without limitation in the attached drawings, in which:

FIGS. 1-3 schematically show different views of an accessory device, according to the invention, in an embodiment;

FIGS. 4-7 schematically show different views of an accessory device, according to the invention, in an embodiment;

FIG. 8 schematically shows the internal structure of the accessory device, according to the invention;

FIG. 9 schematically shows a switching device of the fixed type, which comprises an accessory device, according to the invention;

FIGS. 10-11 schematically show different views of another switching device of the withdrawable type, which comprises an accessory device, according to the invention;

FIG. 12 schematically shows an electric power distribution grid, in which a switching device, which comprises an accessory device, according to the invention, is installed.

With reference to the mentioned figures, the present invention relates to an accessory device 1 for a low or medium voltage switching device 101-102.

The switching device 101-102 comprises a switching unit 2 (FIGS. 9-11) provided with an outer casing 21 that accommodates one or more electric poles (not shown).

Each electric pole comprises one or more movable contacts and corresponding fixed contacts (not shown).

The switching unit 2 preferably houses also a driving mechanism (not shown) that causes the movement of the movable contacts between a first coupling position (closed position), in which they are coupled to the corresponding fixed contacts, and a second separation position (open position), in which they are spaced away from the corresponding fixed contacts.

Preferably, the switching unit 2 is operatively associated with a trip unit 25 (FIG. 8—not shown in FIGS. 9-11) advantageously accommodated within the casing 21.

In general, most of the components of the switching unit 2 and the trip unit 25 may be of known type. They will be further described only for the aspects relevant to the invention, for the sake of brevity.

Referring to FIG. 12, the switching device 101-102 is generally intended to be operatively installed in an electric power distribution grid 800 comprising at least a main power line 500 and an auxiliary power line 200.

The main power line 500 is a low or medium voltage electric line electrically connected with at least a power source (e.g. one or more power generation systems, upstream grid sections, and the like) and adapted to feed at least an electric load (e.g. one or more low or medium voltage apparatuses, downstream grid sections, and the like).

The switching device 101-102 is adapted to be operatively coupled with the main power line 500 to allow or interrupt the passage of current between different power line portions, which have their phase conductors electrically coupled with the electric poles in the switching unit 2. The auxiliary power line 200 is a low voltage electric line adapted to feed electronic components installed in the electric power distribution grid 800 with relatively low feeding voltages (e.g. 250V). Said electronic components may include one or more electronic components of the switching device 101-102 (e.g. the trip unit 25) and outer electronic equipment 900 not included in the switching devices 101-102 but electrically connectable with the auxiliary power line 200 (e.g. electronic devices included in switching devices different from the switching device 101-102, protection relays, control devices, bus communication switches, communication gateways, electronic meters, electronic detection devices, and the like).

In general, the main power line 500 and the auxiliary power line 200 of the electric power distribution grid 800 may be of known type and they will not be further described in the following for the sake of brevity.

As mentioned above, the invention relates to an accessory device 1 intended to be operatively installed on board the switching device 101-102.

The accessory device 1 comprises an outer housing 10, preferably made of electrically insulating material.

Preferably, the housing 10 has a parallelepiped shape with opposite first and second shaped surfaces 10A-10B, opposite third and fourth shaped surfaces 10C-10D and opposite fifth and sixth shaped surfaces 10E-10F.

In a vertical installation position of the accessory device 1 (FIG. 9), the first and second surfaces 10A-10B and the second and third surfaces 10C-10D define respectively first and second pairs of opposite side portions of the housing 10 whereas the fifth and sixth surfaces 10E-10F define respectively top and bottom portions of the housing 10.

According to the invention, the accessory device 1 comprises first electrical connection means 11 adapted to electrically connect said accessory device with the auxiliary power line 200.

Preferably, the first electrical connection means 11 are of the socket/plug type.

Preferably, the first electrical connection means 11 are formed by one or more of socket elements and plug elements arranged at the fifth surface 10E of the housing 10.

In a preferred arrangement, the first electrical connection means 11 are formed by a first socket element integrated with the outer housing 10 at the fifth surface 10E of this latter.

In the embodiment shown in FIGS. 1-3, the socket element 11 comprises a plurality of power socket contacts adapted to be electrically connected (in a known manner) with corresponding contacts of the auxiliary power line 200.

In the embodiment shown in FIGS. 4-7, the first electrical connection means 11 are additionally adapted to electrically connect the accessory device 1 with an external communication field bus 300, for example a bus implementing Ethernet, MODBUS or PROFIBUS communication protocols. In turn, the field bus 300 may be electrically connected with additional outer electronic equipment 901 that may not be electrically connected with the auxiliary power line 200 (e.g. electronic devices included in switching devices different from the switching device 101-102, protection relays, control devices, bus communication switches, communication gateways, electronic meters, electronic detection devices, and the like).

In this embodiment of the invention, the first socket element 11 conveniently comprises a plurality of power socket contacts adapted to be electrically connected (in a known manner) with corresponding power contacts of the auxiliary power line 200 and a plurality of bus socket contacts adapted to be electrically connected (in a known manner) with corresponding bus contacts of the external communication field bus 300.

According to the invention, the accessory device 1 comprises first mechanical connection means 14 adapted to mechanically connect said accessory device with a mechanical support component 23, 51 of the switching device 101-102.

Preferably, the first mechanical connection means 14 comprises first coupling portions of the housing 10 (e.g. formed by suitably shaped coupling surfaces, edges, protrusions, holes, recesses, seats and the like) conveniently arranged at the sixth surface 10F of the housing 10 and at one or more of the first, second, third, fourth surfaces 10A-10D of the housing 10, proximally to the sixth surface 10F.

Advantageously, the first shaped coupling portions 14 are arranged so as to be geometrically conjugate or complementary with corresponding mechanical coupling portions 230, 510 of the support components 23, 51 of the switching device 101-102.

Preferably, the accessory device 1 comprises second electrical connection means 12 adapted to electrically connect said accessory device with one or more further accessory devices 80 for said switching device.

In principle, the further accessory devices 80 may be of any type, according to the needs.

In general, the further accessory devices 80 are electronic devices providing different functionalities with respect the accessory device 1.

Preferably, the second electrical connection means 12 are of the socket/plug type.

Preferably, the second electrical connection means 12 are formed by one or more of socket elements and plug elements arranged at one or more of the third and fourth surfaces 10C-10D of the housing 10.

In the embodiment shown in FIGS. 1-3, the second electrical connection means 12 are formed by a second socket element and by a first plug element integrated with the housing 10 respectively at the third surface 10C and at the fourth surface 10D of said housing. In this case, the accessory device 1 is capable of providing electrical connectivity with different additional accessory devices 80 at opposite sides of its housing 10.

In the embodiment shown in FIGS. 4-7, the second electrical connection means 12 are formed by a single second plug element integrated with the housing 10 at the fourth surface 10D of this latter. In this case, the accessory device 1 is capable of providing electrical connectivity with another accessory device 80 only at one side of the housing 10.

In both the above-mentioned embodiments, each of the above-mentioned socket and plug elements 12 may be connected with corresponding electrical connection means 81 of another accessory device 80 for the switching device 1.

Preferably, each of the above-mentioned socket and plug elements 12 comprises power socket contacts adapted to be electrically connected (in a known manner) with corresponding power contacts of another accessory device 80 and bus socket contacts (for example configured to implement a local field bus implementing a CAN communication protocol) adapted to be electrically connected (in a known manner) with corresponding bus contacts of another accessory device 80.

In the embodiment shown in FIGS. 4-7, the accessory device 1 comprises also third electrical connection means 13 adapted to electrically connect said accessory device with one or more electronic components of the switching device 101-102, for example the trip unit 25.

Preferably, the third electrical connection means 13 are of the socket/plug type.

Preferably, the third electrical connection means 13 are formed by one or more of socket elements and plug elements arranged at the sixth surface 10F of the housing 10.

In a preferred arrangement, the second electrical connection means 12 are formed by a third socket element integrated with the housing 10 at the sixth surface 10F of this latter. Preferably, the third socket element 13 comprises power socket contacts adapted to be electrically connected (in a known manner) with corresponding power contacts of one or more electronic components of the switching device 101-102 and bus socket contacts (for example configured to implement a local field bus implementing Ethernet, MODBUS or PROFIBUS communication protocols) adapted to be electrically connected (in a known manner) with corresponding bus contacts of one or more electronic components of the switching device 101-102.

Preferably, the accessory device 1 comprises second mechanical connection means 15 adapted to mechanically connect said accessory device with one or more further accessory devices 80 for the switching device 101-102.

Preferably, the second mechanical connection means 15 comprises second coupling portions of the housing 10 (e.g. formed by suitably shaped coupling surfaces, edges, protrusions, holes, recesses, seats and the like) conveniently arranged at one or more of the third and fourth surfaces 10C-10D of the housing 10.

Advantageously, the second shaped coupling portions 15 are arranged so as to be geometrically conjugate or complementary with corresponding mechanical coupling portions 82 of another accessory device 80.

In general, the accessory device 1 is adapted to provide communication functionalities with outer electronic equipment 900, 901 of the electronic power distribution grid 800.

In principle, the accessory device 1 may be installed on board the switching device 101-102 as stand-alone device. In this case, the accessory device 1 may employ the third electrical connection means 13 for communication purposes with one or more electronic components of the switching device 101-102 and, at the same time, for providing a feeding voltage to said electronic components.

However, preferably, the accessory device 1 is operatively coupled with one or more further accessory devices 80 by means of the second electrical connection means 12 and the second mechanical connection means 15. In this way, the accessory device 1 may conveniently form an accessory device assembly having a modular structure in cooperation with the further accessory devices 80.

In this case, the accessory device 1 may employ the second electrical connection means 12 for communication purposes with further accessory devices 80 and for providing a feeding voltage to said further accessory devices (embodiments of FIGS. 1-3 and 4-7).

Additionally, the accessory device 1 may employ the third electrical connection means 13 for communication purposes with one or more electronic components of the switching device 101-102 and for providing a feeding voltage to said electronic components (embodiment shown in FIGS. 4-7).

A basic aspect of the invention consists in that the accessory device 1 employs Power Line Communication (PLC) technologies to carry out the above-mentioned communication functionalities.

As is known, PLC technologies allow electric power lines to be used as communication media to connect various network nodes in local and wide area networks, in addition to distributing and conducting electric power. IEEE 1901.1 standard specifies in details the technical requirements to employ PLC technologies in smart grid applications.

Since an electric distribution grid 800 is typically provided with an auxiliary power line 200, which operates at low voltages to feed the installed electronic devices, the accessory device 1 is arranged in such a way to exploit the auxiliary power line 200 not only for power supply purposes nut also for communication purposes among the electronic devices of said power distribution grid and, possibly, for connecting said electronic devices to the Internet or other communication networks.

According to the present invention, the accessory device 1 comprises a PLC unit 17 electrically connected with the auxiliary power line 200 and adapted to communicate with outer electronic equipment 900 electrically connected with the auxiliary power line 200 by transmitting and receiving communication signals S along the auxiliary power line 200.

Conveniently, communication signals S may be AC electric signals of analog type travelling along the auxiliary power line 200 at relatively high frequencies (e.g. up to 12 MHz) and overlapped with the feeding voltages and currents normally provided by said auxiliary power line.

The waveform and the frequency of the communication signals S may be designed according to the needs. Communication signals S may in fact be employed for any purposes, e.g. for exchanging data, exchanging control information and/or other types of information between the accessory device 1 and with the outer electronic equipment 900 electrically connected with the auxiliary power line 200.

According to a preferred embodiment of the invention, the accessory device 1 comprises an internal power line 117 electrically connecting the PLC unit 17 with the first electrical connection means 11, preferably with the power contacts of the first socket element 11.

The power line 117 may be of known type. For example, it may comprise one or more conductive cables or include one or more conductive tracks on a circuit board.

Conveniently, the PLC unit 17 is adapted to transmit and receive the above-mentioned communication signals S through the internal power line 117 and the first electrical connection means 11, so that these communication signals can travel along the auxiliary power line 200.

Preferably, the PLC unit 17 comprises a first processing module 171 and a power line interface module 172 operatively coupled (in a known manner) with the first processing module 171, e.g. by means an internal communication bus of known type.

Preferably, the first processing module 171 comprises one or more digital processing devices (e.g. microprocessors), which are configured to execute suitable software instructions stored in a memory to carry out the functionalities provided for said first processing module.

Preferably, the first processing module 171 is adapted to carry out communication interface functionalities with the outer electronic equipment 900. Conveniently, the first processing module 171 is further adapted to suitably drive the power line interface module 172.

Preferably, the power line interface module 172 is electrically connected with the auxiliary power line 200, more preferably through the internal power line 117 and the electrical connection means 11.

Preferably, the first interface module 172 comprises electronic circuits adapted to manage the transmission and reception of communication signals along a power line, in particular manage the transmission and reception of the communication signals S along the internal power line 117, the first electronic means 11 and the auxiliary power line 200 in accordance with PLC operating principles.

As an example, the first interface module 172 is configured to receive analog communication signals S from outer electronic equipment 900 (conveniently through auxiliary power line 200, the first electronic means 11 and the internal power line 117), convert said analog communication signals into suitable digital communication signals and transmit said digital communication signals to the first processing module 171.

As a further example, the first interface module 172 is configured to receive digital communication signals transmitted by the first processing module 171, convert said digital communication signals into analog communication signals S and transmit said analog communication signals to the external equipment 900 (conveniently through the internal power line 117, the first electronic means 11 and the auxiliary power line 200).

In general, the first processing module 171 and the first interface module 172 may be realized in practice according to circuital or processing solutions of known type, e.g. those suggested by IEEE 1901.1 standard.

According to a preferred embodiment of the invention, the accessory device 1 comprises an additional processing unit 18 operatively coupled with the PLC unit 17.

Preferably, the additional processing unit 18 comprises a second processing module 181 operatively coupled (in a known manner) with the first processing module 171 and a bus interface module 182 operatively coupled (in a known manner) with the second processing module 181.

Preferably, the second processing module 181 comprises one or more digital processing devices (e.g. microprocessors), which are configured to execute suitable software instructions stored in a memory to carry out the functionalities provided for said second processing module.

Preferably, the second processing module 181 is adapted to carry out communication interface functionalities among the first processing unit 171, one or more further accessory devices 80, one or more electronic components of the switching device 101-102 (e.g. the trip unit 25) and, possibly and further outer equipment 901 (e.g. electronic devices electrically disconnected from the auxiliary power line 200). Conveniently, the second processing module 181 is further adapted to suitably drive the bus interface module 182.

According to an operation mode, the first processing module 171 and the second processing module 181 operate respectively as a slave device and a master device when interacting one with another. In this case, the second processing module 181 is adapted to exert an unidirectional control over the first processing module 171 and the accessory device 1 operates as "Central Coordinator (CCO)" as provided for IEEE1901.1 standard.

According to an alternative operation mode, the first processing module 171 and the second processing module 181 operate respectively as a master device and a slave device when interacting one with another. In this case, the accessory device 1 operates as "Station (STA)" as provided for IEEE1901.1 standard.

Preferably, the second interface module 182 comprises suitable electronic circuits adapted to manage the transmission and reception of communication signals along communication field buses internal or external to the accessory device 1, for example communication buses implementing CAN, Ethernet, MODBUS or PROFIBUS communication protocols.

When it is provided with the second electrical connection means 12, the accessory device 1 comprises the second interface module 182 electrically connected 8 (in a known manner) with the second electrical connection means 12, more preferably with the bus contacts of the socket and/or plug elements 12. In this way, the second processing module 181 can communicate with suitable processing modules embedded in the further accessory devices 80 that are operatively coupled with the accessory device 1.

When it is provided with the third electrical connection means 13, the accessory device 1 comprises the second interface module 182 electrically connected with the third electrical connection means 13 (more preferably with the bus contacts of the socket element 13) by means of a first internal communication field bus 61 of known type. In this way, the second processing module 181 can communicate with suitable processing modules embedded in one or more electronic components of the switching device 101-102.

When it is operatively coupled with an outer communication field bus 300, the accessory device 1 comprises the second interface module 182 electrically connected with the first electrical connection means 11, preferably with the bus contacts of the socket element 11, by means of a second internal communication field bus 62 of known type. In this way, the second processing module 181 can communicate with suitable processing modules embedded in the additionally outer electronic equipment 901 electrically disconnected from the auxiliary power line 200. In general, the second processing module 181 and the second interface module 182 may be realized in practice according to circuital or processing solutions of known type, for example those suggested by currently available IEEE standards.

According to a preferred embodiment of the invention, the accessory device 1 comprises a power supply unit 19 electrically connected (in a known manner) with the first electrical connection means 11 to be fed by the auxiliary power line 200.

By means of additional internal power lines 190, the power supply unit 19 is electrically connected with one or more internal components of the accessory device, such as the PLC unit 17, the additional processing unit 18 and the second electrical connection means 12 and the third electrical connection means 13, and it is adapted to provide one or more power supply voltages to said internal components.

In general, the power supply unit 19 may be realized in practice according to circuital or processing solutions of known type. As an example, it may comprise suitably arranged AC/DC conversion circuits, LDO regulation circuits, galvanic isolation circuits and the like.

In a further aspect, the present invention relates to a switching device 101 of the fixed type that comprises the accessory device 1, according to the invention.

A switching device 101 of the fixed type is shown in FIG. 9.

The switching device 101 comprises the switching unit 2 basically arranged as described above.

The switching unit 2 has the outer casing 21 permanently fixed to a supporting structure of a cabinet (not shown).

The switching device 101 comprises the accessory device 1 positioned externally to the outer casing 21, conveniently on a first support surface 23 of the outer casing 21.

Preferably, the accessory device 1 is included in an accessory device assembly together with further accessory devices 80. Said accessory device assembly is preferably arranged on the first support surface 23 in such a way that the accessory device 1 and the further accessory devices 80 are substantially oriented as the switching unit 2 in its installation position.

When the accessory device 1 is operatively positioned on the first support surface 23, the first mechanical connection means 14 engage first mechanical coupling portions 230 of the first support surface 23. A mechanical and electrical connection may be further realized between the accessory device 1 and the further accessory devices 80 by coupling the second electrical connection means 12 and the second mechanical connection means 15 of the accessory device 1 with corresponding electrical connection means 81 and mechanical connection means 82 of the further accessory devices 80, respectively.

The switching unit 2 comprises first electrical connections (not shown) including one or more electrical conductors having a terminal board (not shown) integrated with the outer casing 21 and advantageously electrically connected with one or more internal electronic components of the switching unit 2, e.g. the trip unit 25 (FIG. 8).

When the accessory device 1 is operatively positioned on the first support surface 23, an electrical connection may be established between the accessory device 1 and one or more electronic components of the switching device 101 (e.g. the trip unit 25) by coupling the third electrical connection means 13 and the above-mentioned first electrical connections of the switching unit 2, respectively.

In a further aspect, the present invention relates to a switching device 102 of the withdrawable type that comprises the switching device assembly 400.

A switching device 101 of the withdrawable type is shown in FIGS. 10-11.

The switching device 102 comprises the switching unit 2 basically arranged as described above.

The switching device 102 comprises a supporting frame 5, into/from which the switching unit 2 can be inserted/withdrawn.

The switching device 101 comprises the accessory device 1 positioned externally to the outer casing 21, conveniently on a second support surface 51 of the supporting frame 5.

Preferably, the accessory device 1 is included in an accessory device assembly together with further accessory devices 80. Said accessory device assembly is preferably arranged on the second support surface 51 in such a way that the accessory device 1 and the further accessory devices 80 are substantially oriented in a perpendicular manner with respect to the switching unit 2 in its installation position.

When the accessory device 1 is operatively positioned on the support surface 51, the first mechanical connection means 14 engage second mechanical coupling portions 510 of the second support surface 51. A mechanical and electrical connection may be established between the accessory device 1 and the further accessory devices 80 by coupling the second electrical connection means 12 and the second mechanical connection means 15 of the accessory device 1 with corresponding electrical connection means 81 and mechanical connection means of the further accessory devices 80, respectively.

The switching unit 2 comprises second electrical connections (not shown) including sliding contacts electrically connectable with one or more internal electronic components of the switching unit 2, e.g. the trip unit 25 (FIG. 8).

When the accessory device 1 is operatively positioned on the support surface 23, an electrical connection may be established between the accessory device 1 and one or more electronic components of the switching device 102 (e.g. the trip unit 25) by coupling the second electrical connection means 13 and the above-mentioned second electrical connections of the switching unit 2.

When the switching unit 2 is inserted into the supporting frame 5, the sliding contacts of the above-mentioned second electrical connections are coupled and provide an electrical connection between the accessory device 1 and the electronic components of the switching device 102.

When the switching unit 2 is withdrawn from the supporting frame 5, the sliding contacts of the above-mentioned second electrical connections are decoupled and the electrical connection of the accessory device 1 and the electronic components of the switching device 102 is unplugged without intervening on the accessory device 1.

The accessory device 1, according to the invention, provides relevant advantages with respect to currently available solutions of the state of the art.

FIG. 12 schematically shows an electric power distribution grid 800, in which a switching device 101-102, which comprises the accessory device 1, according to the invention, is installed. Thanks to the employment of the PLC unit 17, the accessory device 1 allows using the auxiliary power line 200 as a communication channel to communicate with outer electronic equipment 900 electrically connected with the auxiliary power line 200 and, more generally, with remote computerised devices or platforms.

As an example, the accessory device 1 can communicate with electronic components 900A (e.g. the trip units) of switching devices operatively coupled with the same main power line 500 operatively coupled with the switching device 101-102.

As a further example, the accessory device 1 can communicate with electronic components 900B (e.g. the trip units) of switching devices operatively coupled with a power line 500A different from the power line 300 operatively coupled with the switching device 101-102.

As yet a further example, the accessory device 1 can communicate with electronic devices 900C (e.g. protection relays, control devices, bus communication switches, gateways, electronic meters and other detection devices) not necessarily embedded in corresponding switching devices and fed by the auxiliary power line 200.

By suitably arranging an electronic device 900C as an Ethernet gateway, the accessory device 1 may easily communicate with remote computerised devices or platforms through the Internet or dedicated communication networks. As an example, the accessory device 1 may communicate with a computerised platform of a utility plant through the Internet.

The accessory device 1 is thus capable of providing communication functionalities with outer electronic equipment 900 without arranging dedicated communication field buses.

The accessory device 1 allows obtaining a remarkable simplification of the wiring operations requested to manufacture and install the switching device 101-102 on the field as no wiring operations specifically dedicated to communication functionalities need to be carried out.

Thanks to the accessory device 1, the auxiliary power line 200 can fulfil its traditional duties of feeding the electronic devices of the electric power distribution grid 800 and, at the same time, operate as a communication channel for the purpose of exchanging information between the accessory device 1 and outer electronic equipment 900.

Such communication functionalities may include, for example, supporting the electronic devices of the electric power distribution grid 800 in their functionalities, implementing data transmission and monitoring functionalities in cooperation with remote computerised devices or platforms (possibly via the Internet) and/or implementing control functionalities at switching device level or at grid level (e.g. fast selectivity control functionalities).

The accessory device 1, according to the invention, can be easily installed on board a switching device 101-102 and it can be operatively coupled with the auxiliary power line 200, with further accessory devices 80 and with one or more electronic components of the switching device 101-102 (e.g. the trip unit 25) in a very simple manner, namely according to a "plug & play" mode. The accessory device 1, according to the invention, has proven to be of relatively easy and cheap realization at industrial level and practical installation on the field.

The invention claimed is:

1. An accessory device for a low or medium voltage switching device comprising an outer housing, first electrical connection means comprising a socket or a plug adapted to electrically connect said accessory device with an auxiliary power line feeding electronic components of an electric power distribution grid, first mechanical connection means including first coupling portions of said outer housing adapted to mechanically connect with corresponding mechanical coupling portions of mechanical support components of said switching device wherein it comprises a power line communication unit electrically connectable with said auxiliary power line through said first electrical connection means and capable of communicating with outer electronic equipment electrically connected with said auxiliary power line by transmitting and receiving communication signals along said auxiliary power line, said communication signals being analog AC signals travelling at high frequencies and overlapped with feeding voltages and currents provided by said auxiliary power line.

2. The accessory device, according to claim 1, which further comprises an internal power line electrically connecting said power line communication unit with said first electrical connection means, said power line communication unit being configured to transmit and receive said communication signals through said internal power line and said first electrical connection means.

3. The accessory device, according to claim 1, wherein said power line communication unit comprises a first processing module and a power line interface module operatively coupled with said first processing module and electrically connected with said auxiliary power line.

4. The accessory device, according to claim 3, which further comprises an additional processing unit operatively coupled with said power line communication unit, said additional processing unit comprising a second processing module operatively coupled with said first processing module and a bus interface module operatively coupled with said second processing module.

5. The accessory device, according to claim 4, wherein said first processing module and said second processing module operate respectively as a slave device and a master device, or vice-versa, when interacting one with another.

6. The accessory device, according to claim 1, which further comprises second electrical connection means comprising a socket or a plug adapted to electrically connect said accessory device with one or more further accessory devices of said switching device.

7. The accessory device, according to claim 1, which further comprises third electrical connection means comprising a socket or a plug adapted to electrical connect said accessory device with one or more electronic components of said switching device.

8. The accessory device, according to claim 1, which further comprises second mechanical connection means comprising second coupling portions of said outer housing adapted to mechanically connect with corresponding coupling portions of a further accessory device for said switching device.

9. The accessory device, according to claim 1, wherein said first electrical connection means are additionally adapted to electrically connect said accessory device with an external communication bus.

10. The accessory device, according to claim 5, which further comprises second electrical connection means comprising a socket or a plug adapted to electrically connect said accessory device with one or more further accessory devices of said switching device; and
wherein said bus interface module is operatively coupled with said second electrical connection means.

11. The accessory device, according to claim 9, wherein said bus interface module is operatively coupled with said first electrical connection means by means of a first internal communication field bus.

12. The accessory device, according to claim 5, which further comprises third electrical connection means comprising a socket or a plug adapted to electrical connect said accessory device with one or more electronic components of said switching device; and
said bus interface module is operatively coupled with said third electrical connection means by means of a second internal communication field bus.

13. A switching device which further comprises an accessory device according to claim 1.

14. The switching device, according to claim 13, which further comprises a switching unit having an outer casing provided with a first external supporting surface, said accessory device being arranged on said external supporting surface.

15. The switching device, according to claim 13, which further comprises a switching unit and a supporting frame, into or from which said switching unit can be inserted or withdrawn, said accessory device being arranged on a second external surface of said supporting frame.

16. An electric power distribution grid comprising a switching device, outer electronic equipment not included in said switching device and an auxiliary power line adapted to feed one or more electronic components of said switching device and said outer electronic equipment, wherein said switching device comprises an accessory device, according to claim 1.

17. The accessory device, according to claim 2, wherein said power line communication unit comprises a first processing module and a power line interface module operatively coupled with said first processing module and electrically connected with said auxiliary power line.

18. The accessory device, according to claim 17, which further comprises an additional processing unit operatively coupled with said power line communication unit, said additional processing unit comprising a second processing module operatively coupled with said first processing module and a bus interface module operatively coupled with said second processing module.

19. The accessory device, according claim 2, which further comprises second electrical connection means comprising a socket or a plug adapted to electrically connect said accessory device with one or more further accessory devices of said switching device.

20. The accessory device, according claim 2, which further comprises third electrical connection means comprising a socket or a plug adapted to electrical connect said accessory device with one or more electronic components of said switching device.

21. An accessory device for a low or medium voltage switching device comprising an outer housing, first electrical connection means adapted to electrically connect said accessory device with an auxiliary power line and first mechanical connection means adapted to mechanically connect said accessory device with a mechanical support component of said switching device wherein it comprises a power line communication unit electrically connectable with said auxiliary power line through said first electrical connection means and adapted to communicate with outer electronic equipment electrically connected with said auxiliary power line by transmitting and receiving communication signals along said auxiliary power line, wherein said power line communication unit comprises a first processing module and a power line interface module operatively coupled with said first processing module and electrically connected with said auxiliary power line, and further comprising an additional processing unit operatively coupled with said power line communication unit, said additional processing unit comprising a second processing module operatively coupled with said first processing module and a bus interface module operatively coupled with said second processing module.

22. An accessory device for a low or medium voltage switching device comprising an outer housing, first electrical connection means adapted to electrically connect said accessory device with an auxiliary power line and first mechanical connection means adapted to mechanically connect said accessory device with a mechanical support component of said switching device wherein it comprises a power line communication unit electrically connectable with said auxiliary power line through said first electrical connection means and adapted to communicate with outer electronic equipment electrically connected with said auxiliary power line by transmitting and receiving communication signals along said auxiliary power line, further comprising an internal power line electrically connecting said power line communication unit with said first electrical connection means, said power line communication unit being configured to transmit and receive said communication signals through said internal power line and said first electrical connection means, wherein said power line communication unit comprises a first processing module and a power line interface module operatively coupled with said first processing module and electrically connected with said auxiliary power line, and further comprising an additional processing unit operatively coupled with said power line communication unit, said additional processing unit comprising a second processing module operatively coupled with said first processing module and a bus interface module operatively coupled with said second processing module.

* * * * *